(12) United States Patent
Brothers et al.

(10) Patent No.: US 7,040,404 B2
(45) Date of Patent: May 9, 2006

(54) METHODS AND COMPOSITIONS FOR SEALING AN EXPANDABLE TUBULAR IN A WELLBORE

(75) Inventors: Lance E. Brothers, Chickasha, OK (US); M. Vikram Rao, Houston, TX (US); Anne M. Culotta, Houston, TX (US)

(73) Assignee: Halliburton Energy Services, Inc., Duncan, OK (US)

( * ) Notice: Subject to any disclaimer, the term of this patent is extended or adjusted under 35 U.S.C. 154(b) by 131 days.

(21) Appl. No.: 10/243,001

(22) Filed: Sep. 13, 2002

(65) Prior Publication Data

US 2003/0116319 A1    Jun. 26, 2003

Related U.S. Application Data

(63) Continuation-in-part of application No. 10/006,109, filed on Dec. 4, 2001, now Pat. No. 6,668,928.

(51) Int. Cl.
E21B 33/14 (2006.01)

(52) U.S. Cl. .................. 166/293; 166/300; 166/384

(58) Field of Classification Search ................ 166/285, 166/292–295, 300
See application file for complete search history.

(56) References Cited

U.S. PATENT DOCUMENTS

| | | | | |
|---|---|---|---|---|
| 3,782,466 A | 1/1974 | Lawson et al. | ............. | 166/254 |
| 5,135,577 A | 8/1992 | Brothers | ..................... | 106/724 |
| 5,159,980 A | 11/1992 | Onan et al. | .................. | 166/294 |
| 5,293,938 A | 3/1994 | Onan et al. | .................. | 166/293 |
| 5,389,706 A | 2/1995 | Heathman et al. | ............. | 524/5 |
| 5,588,488 A | 12/1996 | Vijn et al. | ................... | 166/293 |
| 5,667,011 A | 9/1997 | Gill et al. | .................... | 166/295 |
| 5,688,844 A | 11/1997 | Chatterji et al. | ................ | 524/8 |
| 5,718,288 A | 2/1998 | Bertet et al. | ................. | 166/287 |
| 5,738,463 A | 4/1998 | Onan | ....................... | 405/154 |
| 5,794,702 A | 8/1998 | Nobileau | .................... | 166/380 |
| 5,795,924 A | 8/1998 | Chatterji et al. | ............ | 523/130 |
| 5,820,670 A | 10/1998 | Chatterji et al. | ............ | 106/727 |
| 5,833,001 A | 11/1998 | Song et al. | .................. | 166/287 |
| 5,913,364 A | 6/1999 | Sweatman | ................... | 166/281 |
| 5,945,387 A | 8/1999 | Chatterji et al. | ............ | 507/224 |
| 5,964,293 A | 10/1999 | Chatterji et al. | ............ | 166/294 |
| 6,098,711 A | 8/2000 | Chatterji et al. | ............ | 166/294 |
| 6,167,967 B1 | 1/2001 | Sweatman | ................... | 166/281 |
| 6,234,251 B1 | 5/2001 | Chatterji et al. | ............ | 166/295 |
| 6,253,850 B1 * | 7/2001 | Nazzai et al. | ................ | 166/277 |
| 6,258,757 B1 | 7/2001 | Sweatman et al. | .......... | 507/219 |
| 6,271,181 B1 | 8/2001 | Chatterji et al. | ............ | 507/219 |
| 6,328,106 B1 | 12/2001 | Griffith et al. | .............. | 166/295 |
| 6,330,917 B1 | 12/2001 | Chatterji et al. | ............ | 166/295 |
| 6,431,282 B1 | 8/2002 | Bosma et al. | ............... | 166/288 |
| 6,448,206 B1 | 9/2002 | Griffith et al. | .............. | 507/219 |
| 6,668,928 B1 * | 12/2003 | Brothers | ...................... | 166/292 |
| 6,722,433 B1 | 4/2004 | Brothers et al. | ............ | 166/288 |
| 6,834,725 B1 | 12/2004 | Whanger et al. | ........... | 166/384 |
| 6,848,505 B1 | 2/2005 | Richard et al. | ............. | 166/285 |
| 6,854,522 B1 | 2/2005 | Brezinski et al. | ........... | 166/387 |
| 2003/0116319 A1 | 6/2003 | Brothers et al. | ............. | 166/287 |
| 2004/0123983 A1 | 7/2004 | Cook et al. | .................... | 166/50 |
| 2004/0194971 A1 | 10/2004 | Thomson | ..................... | 166/387 |

FOREIGN PATENT DOCUMENTS

| | | | |
|---|---|---|---|
| EP | 0 520 839 A1 | | 12/1992 |
| EP | 0 879 933 A2 | | 11/1998 |
| EP | 0 980 957 A1 | | 3/2000 |
| EP | 01306178.3 | * | 7/2001 |
| GB | 2 396 635 A | | 6/2004 |
| GB | 3 396 869 A | | 7/2004 |
| WO | WO 03/008756 A1 | | 1/2003 |

* cited by examiner

*Primary Examiner*—Zakiya W. Bates
(74) *Attorney, Agent, or Firm*—Craig W. Roddy; Baker Botts L.L.P.

(57) ABSTRACT

Methods and compositions are provided for sealing an expandable tubular in a wellbore wherein the methods basically comprise placing the expandable tubular in the wellbore, placing a resilient sealing composition into the wellbore, expanding the expandable tubular and allowing the sealing composition to set in the wellbore.

126 Claims, No Drawings

METHODS AND COMPOSITIONS FOR SEALING AN EXPANDABLE TUBULAR IN A WELLBORE

CROSS-REFERENCE TO RELATED APPLICATION

This Application is a Continuation-In-Part of application Ser. No. 10/006,109 filed Dec. 4, 2001, now U.S. Pat. No. 6,668,928.

BACKGROUND

The present embodiment relates generally to a composition for sealing a subterranean zone penetrated by a wellbore and, more particularly, to methods and compositions for sealing an expandable tubular such as a pipe, pipe string, casing, liner or the like in a wellbore.

In the drilling and completion of an oil or gas well, a composition is often introduced in the wellbore for cementing casing or pipe strings. In this process, known as "primary cementing," a composition is pumped into the annular space between the walls of the wellbore and the pipe string. The composition sets in the annular space, supporting and positioning the pipe string, and forming a substantially impermeable barrier which divides the wellbore into subterranean zones. After primary cementing, the undesirable migration of fluids between zones is prevented. Likewise, compositions are often subsequently introduced into a subterranean zone for remedial operations to recover circulation or to plug the wellbore. Most remedial operations comprise introducing a composition into the wellbore to reestablish a seal between the zones.

Previously, a variety of cement compositions have been used for cementing. However, cement is undesirable for use with expandable casing. After the expandable casing is placed down hole, a mandrel is run through the casing to expand the casing, and expansions up to twenty five percent are possible. As cement is incompressible, expansion of the casing can lead to crushing of the cement, and consequent loss of effectiveness regarding the zones. Therefore, a resilient sealing composition with comparable strength to cement, but greater elasticity and compressibility is required for cementing expandable casing.

DESCRIPTION

A sealing composition according to the present embodiment basically comprises a polymer and metal containing compound. A particularly preferred sealing composition comprises a mixture of latex, dithio carbamate, zinc oxide, and sulfur, for sealing a subterranean zone penetrated by a wellbore. The sulfur containing component vulcanizes the latex to form a solid mass which seals the zone. Preferred polymeric sealing compositions of the present invention are resilient with comparable strength to cement but have greater elasticity and compressibility for use in cementing expandable casing.

In a first embodiment, the composition comprises a mixture of latex, dithio carbamate, zinc oxide, and sulfur. Preferably, the amount of latex is maintained at a 41–90 percent ratio by weight of the composition. The dithio carbamate is preferably present in an amount that is 0.1–2 percent of the latex by weight. The zinc oxide is preferably present in an amount that is 2–5 percent of the latex by weight. The sulfur is preferably present in an amount that is 1–4 percent of the latex by weight.

The composition may further comprise stearic acid. The stearic acid is preferably present in an amount that is 0.1–2 percent of the latex by weight.

The composition may further comprise a weighting agent. The weighting agent is preferably present in an amount that is 0.1–150 percent of the latex by weight.

The composition may further comprise propylene glycol for defoaming, such as is available from Halliburton Energy Services of Duncan, Okla., under the trademark "D-AIR3™." The propylene glycol is preferably present in an amount that is 0.001–0.2 percent of the latex by weight.

In a second embodiment, the sealing composition comprises a mixture of latex, dithio carbamate, zinc oxide, sulfur, and a foaming agent, wherein the mixture is foamed using a gas, such as nitrogen or air, which is generally present in the range of from about 0% to about 40% by volume of the sealing composition. Preferably, the amount of latex is maintained at a 41–90 percent ratio by weight of the composition. The dithio carbamate is preferably present in an amount that is 0.1–2 percent of the latex by weight. The zinc oxide is preferably present in an amount that is 2–5 percent of the latex by weight. The sulfur is preferably present in an amount that is 1–4 percent of the latex by weight. The foaming agent is preferably present in an amount that is 2–4 percent of the latex by weight.

The composition may further comprise stearic acid. The stearic acid is preferably present in an amount that is 0.1–2 percent of the latex by weight.

The composition may further comprise a weighting agent. The weighting agent is preferably present in an amount that is 0.1–150 percent of the latex by weight.

As will be understood by those skilled in the art, polymeric sealing compositions of the present invention may include any of a variety of well known polymers including, but not limited to, copolymers, terpolymers and interpolymers. Latex is preferably used for either embodiment and may be any of a variety of well known rubber materials commercially available which contain unsaturation in the backbone of the polymer. These include natural rubber (cis-1,4-polyisoprene), modified types thereof, synthetic polymers, and blends of the foregoing. The synthetic polymers include styrene/butadiene rubber, polybutadiene rubber, neoprene rubber, acrylonitrile/butadiene rubber, polyisoprene rubber, isobutylene/isoprene rubber, and ethylene/propylene rubber. Additional polymers suitable for either embodiment include an ethylene propylene diene polymer, an isobutylene-isoprene copolymer, halogenated derivatives of an isobutylene-isoprene copolymer, a butadiene-isoprene copolymer, a poly(isobutylene-co-styrene) polymer, halogenated derivatives of a poly(isobutylene-co-styrene) polymer, a poly(isobutylene-co-alkyl styrene) polymer, halogenated derivatives of a poly(isobutylene-co-alkyl styrene) polymer, a poly(isobutylene-co-haloalkyl styrene) polymer and halogenated derivatives of a poly(isobutylene-co-haloalkyl styrene) polymer. Preferably, the halogenated derivatives are halogenated with chlorine or bromine.

The metal containing compounds of the present invention may comprise zinc, tin, iron, selenium magnesium, chromium, nickel, or cadmium. Further, the compounds may be in the form of an oxide, carboxylic acid salt, a complex with a dithiocarbamate ligand, or a complex with a mercaptobenzothiazole ligand.

For either embodiment, the composition preferably includes a latex comprising a styrene/butadiene copolymer latex emulsion prepared by emulsion polymerization. The weight ratio of styrene to butadiene in the latex can range from 10:90 to 90:10. The emulsion is a colloidal dispersion of the copolymer. The colloidal dispersion includes water from about 40–70% by weight of the emulsion. In addition to the dispersed copolymer, the latex often includes small quantities of an emulsifier, polymerization catalysts, chain modifying agents and the like. Also, styrene/butadiene latexes are often commercially produced as terpolymer latexes which include up to about 3% by weight of a third monomer to assist in stabilizing the latex emulsions. Nonionic groups which exhibit stearic effects and which contain long ethoxylate or hydrocarbon tails can also be present.

Most preferably for either embodiments, the composition includes a latex with a styrene/butadiene weight ratio of about 25:75, with the styrene/butadiene copolymer suspended in a 50% by weight aqueous emulsion, available from Halliburton Energy Services of Duncan, Okla., under the trademark "LATEX 2000™."

The weighting agent for either embodiment may be silica flour, such as is available from Halliburton Energy Services of Duncan, Okla., under the trademark "SSA-1™." Alternatively, the weighting agent may be manganese oxide weighting additive, available from Halliburton Energy Services of Duncan, Okla., under the trademark "MICROMAX™." Alternatively, the weighting agent may be crystalline silica with an average particle size of 10 microns, available from Halliburton Energy Services of Duncan, Okla., under the trademark "MICROSAND™."

Dithio carbamate for either embodiment is available from Halliburton Energy Services of Duncan, under the trademark "FLEXCEM COMPONENT L™."

The foaming agent for the second embodiment may be an ethoxylated alcohol ether sulfate surfactant, which is available from Halliburton Energy Services of Duncan, under the trademark "ZONE SEAL 2000™." The ZONE SEAL 2000 surfactant is the subject of U.S. Pat. No. 6,063,738, the entire disclosure of which is incorporated herein as if reproduced in its entirety. Alternatively, the foaming agent may be an amidopropylbetaine surfactant, which is available from Halliburton Energy Services of Duncan, under the trademark "HC-2™." The HC-2™ surfactant is discussed in U.S. Pat. No. 5,588,489, the entire disclosure of which is incorporated herein as if reproduced in its entirety.

The following examples are illustrative of the methods and compositions discussed above.

EXAMPLE 1

To test curing properties of the first embodiment, 450 grams of LATEX 2000™ latex, and components in the amounts listed in TABLE 1 were added to form three batches. Each of the batches was mixed in a Waring blender. The batches were poured into receptacles and incubated at the temperatures listed.

TABLE 1

| Component | Batch 1 | Batch 2 | Batch 3 |
|---|---|---|---|
| FLEXCEM COMPONENT L ™ dithio carbamate | 5.6 g | 5.6 g | 4.5 g |
| Zinc Oxide | 9 g | 9 g | 22.5 g |
| Sulfur | 9 g | 9 g | 13.5 g |
| Stearic acid | — | 9 g | 4.5 g |
| D-AIR3 ™ propylene glycol | 14.6 g | 14.6 g | 3 g |
| SSA-1 ™ silica flour | 600 g | 600 g | — |
| Comments | No Set; 48 hr at 80° F. | Set; 48 hr at 150° F. | Set; 5.5 hr at 150° F. |

TABLE 1 shows that the second and third batches set.

EXAMPLE 2

To test curing properties of the first embodiment with a different weighting agent, 100 grams of LATEX 2000™ latex (with the exception of Batch 8), and components in the amounts listed in TABLE 2 (including a $C_{15}$ alcohol ethoxylated with 15 moles of ethylene oxide, which is available from Halliburton Energy Services of Duncan, under the trademark "434B™") were added to form eight batches. Each of the batches was mixed in a Waring blender. The batches were poured into receptacles and incubated at the temperatures listed.

TABLE 2

| Component | Batch 1 | Batch 2 | Batch 3 | Batch 4 | Batch 5 | Batch 6 | Batch 7 | Batch 8 (500 g latex) |
|---|---|---|---|---|---|---|---|---|
| FLEXCEM COMPONENT L ™ dithio carbamate | 5.6 g | 5.6 g | 0.75 g | 0.75 g | 4.5 g | 4.5 g | 1.5 g | 2 g |
| Zinc Oxide | 9 g | 9 g | 14 g | 14 g | 22.5 g | 22.5 g | 14 g | 15 g |
| Sulfur | 9 g | 9 g | 9 g | 9 g | 13.5 g | 13.5 g | 9 g | 10 g |
| Stearic acid | — | — | 4.5 g | — | — | — | — | — |
| D-AIR3 ™ propylene glycol | 14.6 g | 14.6 g | 3 g | 3 g | 3 g | 3 g | — | 5 g |
| MICROMAX ™ manganese oxide (15.3 lb/gal) | 600 g | 600 g | 400 g | 400 g | 400 g | 400 g | 400 g | 400 g |
| 434B ™ ethoxylated alcohol | — | 45 g | 45 g | 45 g | 45 g | 45 g | 26 g | 10 g |
| Comments | Latex inverted | No set; 48 h at 80° F. | No set; 24 h at 140° F. | No set; 24 h at 140° F. | Set; 48 hr 140° F. | No set; 48 hr at 200° F. | No set; 24 h at 200° F. | No set; 72 hr at 200° F. |

TABLE 2 shows that the fifth batch set without stearic acid.

EXAMPLE 3

To test curing properties of the second embodiment, LATEX 2000™ latex in the amounts listed in TABLES 3A and 3B, were mixed with components in the amounts listed in TABLES 3A and 3B (including a $C_{15}$ alcohol ethoxylated with 40 moles of ethylene oxide, which is available from Halliburton Energy Services of Duncan, under the trademark "434C™;" a sodium salt of alpha-olefinic sulfonic acid surfactant which is discussed in U.S. Pat. No. 5,588,489, the entire disclosure of which is incorporated herein as if reproduced in its entirety, and is available from Halliburton Energy Services of Duncan, under the trademark "AQF-2™;" an alcohol ether sulfate surfactant which is discussed in U.S. Pat. No. 5,588,489, the entire disclosure of which is incorporated herein as if reproduced in its entirety, and is available from Halliburton Energy Services of Duncan, under the trademark "HOWCO SUDS™;" and ammonium decasulfate, which is available from Halliburton Energy Services of Duncan, under the trademark "CFAS™") were added to form twelve batches. Each of the batches was mixed in a Waring blender with a sealable metal canister. The batches were poured into receptacles and incubated at the temperatures listed.

TABLE 3A

| Components | Batch 1 | Batch 2 | Batch 3 | Batch 4 | Batch 5 | Batch 6 | Batch 7 |
|---|---|---|---|---|---|---|---|
| LATEX 2000 ™ latex | 450 g | 450 g | 450 g | 450 g | 450 g | 600 g | 600 g |
| FLEXCEM COMPONENT L ™ dithio carbamate | 5.6 g | 5.6 g | 5.6 g | 5.6 g | 5.6 g | 6 g | 6 g |
| Zinc Oxide | 9 g | 9 g | 9 g | 9 g | 9 g | 30 g | 30 g |
| Sulfur | 9 g | 9 g | 9 g | 9 g | 9 g | 18 g | 18 g |
| Stearic acid | 9 g | 9 g | 9 g | 9 g | 9 g | — | — |
| D-AIR3 ™ propylene glycol | 14.6 g | 14.6 g | — | — | — | — | — |
| SSA-1 ™ silica flour | 600 g | 600 g | — | — | — | — | — |
| ZONE SEAL 2000 ™ surfactant | 9 g | 18 g | — | 20 g | 20 g | — | — |
| MICROSAND ™ crystalline silica | — | — | 600 g | 600 g | 600 g | — | — |
| 434C ™ ethoxylated alcohol | — | — | 45 g | 45 g | 45 g | — | — |
| AQF-2 ™ surfactant | — | — | 9 g | — | — | — | — |
| HC-2 ™ surfactant | — | — | 4.5 g | — | — | 10 g | 5 g |
| HOWCO SUDS ™ surfactant | — | — | — | — | — | — | 10 g |
| CFAS ™ ammonium decasulfate | — | — | — | — | — | — | — |
| Comments | Unstable foam | Unstable foam | Unstable foam | Unstable foam | Unstable foam | Unstable foam | Unstable foam |

TABLE 3B

| Components | Batch 8 | Batch 9 | Batch 10 | Batch 11 | Batch 12 |
|---|---|---|---|---|---|
| LATEX 2000 ™ latex | 600 g | 600 g | 600 g | 600 g | 675 g |
| FLEXCEM COMPONENT L ™ dithio carbamate | 6 g | 6 g | 6 g | 6 g | 8.4 g |
| Zinc Oxide | 30 g | 30 g | 30 g | 30 g | 13.5 g |
| Sulfur | 18 g | 18 g | 18 g | 18 g | 13.5 g |
| Stearic acid | — | — | — | — | 13.5 g |
| D-AIR3 ™ propylene glycol | — | — | — | — | — |
| SSA-1 ™ silica flour | — | — | — | — | — |
| ZONE SEAL 2000 ™ surfactant | — | — | — | — | 20 g |

TABLE 3B-continued

| Components | Batch 8 | Batch 9 | Batch 10 | Batch 11 | Batch 12 |
|---|---|---|---|---|---|
| MICROSAND crystalline silica | — | — | 200 g | 200 g | 600 g |
| 434C ™ ethoxylated alcohol | — | — | — | — | — |
| AQF-2 ™ surfactant | 10 g | — | — | — | — |
| HC-2 ™ surfactant | 5 g | 5 g | 12 g | 20 g | — |
| HOWCO SUDS ™ surfactant | — | — | — | — | — |
| CFAS ™ ammonium decasulfate | — | 10 g | — | — | — |
| Comments | Unstable foam | Unstable foam | Unstable foam | Foam and placed in cell for 48 hours at 150° F.; set stable foam | Foamed and placed in cell; heated to 190° F. for 2 hours; sand settled from top 1–2 inches of 8 inch column |

TABLES 3A and 3B show that the eleventh and twelfth batches set.

EXAMPLE 4

To test curing properties of the first embodiment, 300 grams of LATEX 2000™ latex, 2 grams D-AIR3™ propylene glycol, and components in the amounts listed in TABLE 4 were added to form eight batches. Each of the batches was mixed in a Waring blender. The batches were poured into receptacles and incubated in a 150° F. water bath.

TABLE 4

| Component | Batch 1 | Batch 2 | Batch 3 | Batch 4 | Batch 5 | Batch 6 | Batch 7 | Batch 8 |
|---|---|---|---|---|---|---|---|---|
| FLEXCEM COMPONENT L ™ dithio carbamate | 3 g | 3 g | 3 g | — | — | — | — | 3 g |
| Zinc Oxide | — | 15 g | 15 g | 15 g | 15 g | — | — | — |
| Sulfur | 9 g | — | 9 g | 9 g | — | 9 g | — | — |
| Stearic acid | 3 g | 3 g | — | 3 g | 3 g | — | 3 g | — |
| Comments | No set | No set | Set | No set | No set | No set | No set | No set |

TABLE 4 shows that the fourth batch set.

EXAMPLE 5

To test shear bond properties of the first embodiment, 450 grams of LATEX 2000™ latex, 1.5 grams of FLEXCEM COMPONENT L™ dithio carbamate, 2 grams of D-AIR3™ propylene glycol, and components in the amounts listed in TABLE 5 were added to form eight batches. Each of the batches was mixed in a Waring blender. The batches were poured into receptacles and incubated before having their shear bond strengths tested. Batches 1–4 were tested after incubation for 48 hours at 200° F. Batches 5–8 were tested after incubation for 12 days at 200° F.

In a conventional shear bond test, the batches were placed in metal cylinders with a metal bar disposed in each of the cylinders. Once a batch set, the bar was supported and positioned by the composition. Shear bond strength was determined by the force required to push the bar out of the cylinder. The shear bond testing method is conventional, and is described in a paper by L. G. Carter and G. W. Evans entitled "A Study of Cement-Pipe Bonding," presented at the Society of Petroleum Engineers California Regional Meeting, held in Santa Barbara, Calif., on Oct. 24–25, 1963.

TABLE 5

| Component | Batch 1 | Batch 2 | Batch 3 | Batch 4 | Batch 5 | Batch 6 | Batch 7 | Batch 8 |
|---|---|---|---|---|---|---|---|---|
| Zinc Oxide | 13.5 g | 13.5 g | 27 g | 27 g | 13.5 g | 13.5 g | 13.5 g | 13.5 g |
| Sulfur | 9 g | 18 g | 9 g | 18 g | 9 g | 9 g | 9 g | 9 g |
| SSA-1 ™ silica flour | 600 g | 600 g | 600 g | 600 g | — | 200 g | 400 g | 600 g |
| Shear bond | 21 psi | 14 psi | 26 psi | 22 psi | 11 psi | 28 psi | 34 psi | 34 psi |

TABLE 5 shows that all the batches bond to metal. Batch 1 also shear bond strengths of 40 psi at 72 hours, 38 psi at 96 hours, and 55 psi at 30 days.

EXAMPLE 6

To test thickening times (TT) for reaching viscosities of 70 BC for the first embodiment, 600 grams of LATEX 2000™ latex, 3 grams of D-AIR3™ propylene glycol, and components listed in the amounts listed in TABLE 6 were added to form ten batches. Each of the batches was mixed in a Waring blender. The batches were poured into receptacles and incubated at the temperatures listed in TABLE 6.

TABLE 6

| Component | Bat. 1 | Bat. 2 | Bat. 3 | Bat. 4 | Bat. 5 | Bat. 6 | Bat. 7 | Bat. 8 | Bat. 9 | Bat. 10 |
|---|---|---|---|---|---|---|---|---|---|---|
| FLEXCEM COMPONENT L™ dithio carbamate | 6 g | 0.75 g | 0.75 g | 1.1 g | 0.75 g | 1 g | 1 g | 2 g | — | — |
| Zinc Oxide | 30 g | 3 g | 6 g | 12 g | 18 g | 18 g | 18 g | 18 g | 18 g | 18 g |
| Sulfur | 18 g | 12 g | 12 g | 12 g | 12 g | 12 g | 12 g | 12 g | 12 g | 12 g |
| Stearic acid | 6 g | 6 g | 6 g | 6 g | 6 g | 12 g | — | — | 12 g | — |
| TT (hr:min) at 150° F. | 1:39; 1:53 | 12+ | 10:26 | 8:20 | 7:37 | 7:44 | 6:00 | 3:39 | — | — |
| TT (hr:min) at 200° F. | — | — | — | — | — | 1:59 | 1:45 | 1:35 | 6:42 | 11+ |

TABLE 6 shows that the set up times can be controlled by varying the amounts of components.

EXAMPLE 7

To test applied pressure for the first and second embodiments, LATEX 2000™ latex, and components listed in the amounts listed in TABLE 7 were added to form three batches. Each of the batches was mixed in a Waring blender.

The first batch, representing the first embodiment, was poured into a test cell, which was sealed and heated to 200° F. for 72 hours. After 72 hours, a valve positioned under a 325 mesh screen on the bottom of the test cell was opened, and a force of 1000 psi was applied to the test cell via a piston from the top of the cell. After approximately an hour, the volume of the batch had reduced by an amount listed in TABLE 7.

The second batch, representing the second embodiment, was poured into a test cell, which was sealed and heated to 170° F. After 48 hours, a force of 1000 psi was applied to the test cell via a piston, and the volume of the batch had reduced by an amount listed in TABLE 7. After seven days, pressure was released, and the volume of the batch returned to 85% of its original size.

The third batch, representing the second embodiment, was poured into a test cell, heated to 170° F., and thereafter, a force of 1000 psi was applied to the test cell via a piston. The volume of the batch was reduced by an amount listed in TABLE 7. After twenty four hours, pressure was released, and the volume of the batch returned to its original size. Thereafter, a force of 1000 psi was applied again and the volume of the batch was reduced by an amount listed in TABLE 7. After twenty four hours, pressure was again released, and the volume of the batch returned to 88% of its original size.

TABLE 7

| Component | Batch 1 Non-foamed Latex | Batch 2 Set Foamed Latex | Batch 3 Liquid Foam Latex |
|---|---|---|---|
| LATEX 2000™ latex | 450 g | 600 g | 600 g |
| FLEXCEM COMPONENT L™ dithio carbamate | 1.5 g | 6 g | 6 g |
| Zinc Oxide | 13.5 g | 30 g | 30 |
| Sulfur | 9 g | 18 g | 6 g |
| HC-2™ surfactant | — | 20 g | 20 g |
| SSA-1™ silica flour | 400 g | — | — |
| Volume reduction | 30% | 40% | 36% |

TABLE 7 shows that the first embodiment is compressible in its set state when placed against a porous geological formation, and the second embodiment is compressible in both set and unset states when placed in a sealed system.

The methods of the present invention for sealing an expandable tubular such as a pipe, pipe string, casing, liner or the like in a wellbore in a subterranean formation basically comprise placing the expandable tubular in the wellbore, placing a sealing composition as described herein into the wellbore, expanding the expandable tubular, and allowing the sealing composition to set in the wellbore. The methods may optionally comprise the step of foaming the sealant composition using a gas such as nitrogen or air. In performing the described methods, the step of placing the expandable tubular in the wellbore may be performed before or after the step of placing the sealing composition into the wellbore. The step of expanding the expandable tubular may also be performed before or after the step of placing the sealing composition into the wellbore. Furthermore, the expandable tubular may be expanded before, after or during the set of the sealing composition. Where the tubular is expanded during or after the set of the sealing composition, preferred resilient compositions of the present invention will remain competent due to their elasticity and compressibility.

In addition to the foregoing methods, the wellbore may extend or be additionally extended into the subterranean formation below the first tubular wherein a second tubular, such as a pipe, pipe string, casing, liner or the like, is placed in the wellbore below the first tubular such that a portion of the second tubular extends into the first tubular. A second sealing composition, in accordance to the embodiments described herein, is placed in the wellbore located below the first tubular and the second tubular is expanded in the wellbore. The step of placing the second tubular in the wellbore may be performed before or after the step of placing the second sealing composition into the wellbore and the step of expanding the second tubular may also be performed before or after the step of placing the second sealing composition into the wellbore. The second tubular may also be expanded before, after or during the set of the either sealing composition. Furthermore, although the first and second tubulars may be expanded at the same time, when the second tubular is expanded inside the previously expanded first tubular, the second tubular may provide additional expansion to an overlapping portion of the first tubular whereby the sealing composition located behind that overlapping portion of the first tubular is further compressed thereby but remains competent due to its elasticity and compressibility.

Although only a few exemplary embodiments of this invention have been described in detail above, those skilled in the art will readily appreciate that many other modifications are possible in the exemplary embodiments without materially departing from the novel teachings and advantages of this invention. Accordingly, all such modifications are intended to be included within the scope of this invention as defined in the following claims.

The invention claimed is:

1. A method of sealing an expandable tubular in a wellbore comprising the steps of:
    placing the expandable tubular in the wellbore;
    placing a resilient sealing composition that comprises a polymer and a metal containing compound into the wellbore;
    expanding the expandable tubular; and
    allowing the sealing composition to set in the wellbore.

2. The method of claim 1 wherein the sealing composition comprises a copolymer, terpolymer, or interpolymer.

3. The method of claim 1 wherein the polymer comprises a latex and the sealing composition further comprises sulfur.

4. The method of claim 3 wherein the latex comprises a styrene/butadiene copolymer.

5. The method of claim 3 wherein the latex has a styrene/butadiene weight ratio of about 25:75, with the styrene/butadiene copolymer suspended in a 50% by weight aqueous emulsion.

6. The method of claim 3 wherein the latex is present in a range of 41% to 90% by weight of the sealing composition.

7. The method of claim 3 wherein the latex comprises at least one from the following group: natural rubber; modified natural rubber; synthetic polymers; and blends thereof.

8. The method of claim 7 wherein the synthetic polymers comprise at least one from the following group: styrene/butadiene rubber; polybutadiene rubber; neoprene rubber; acrylonitrile/butadiene rubber; polyisoprene rubber; isobutylene/isoprene rubber; ethylene/propylene rubber; and combinations thereof.

9. The method of claim 1 wherein the metal containing compound comprises at least one from the following group: zinc; tin; iron; selenium; magnesium; chromium; nickel; cadmium; and combinations thereof.

10. The method of claim 9 wherein the metal containing compound comprises at least one from the following group: oxides; carboxylic acid salts; complexes with a dithiocarbamate ligand; complexes with a mercaptobenzothiazole ligand; and combinations thereof.

11. The method of claim 1 wherein the sealing composition further comprises latex, dithio carbamate, and sulfur.

12. The method of claim 11 wherein the metal containing compound comprises at least one from the following group: zinc; tin; iron; selenium; magnesium; chromium; nickel; cadmium; and combinations thereof.

13. The method of claim 12 wherein the metal containing compound comprises at least one from the following group: oxides; carboxylic acid salts; complexes with a dithiocarbamate ligand; complexes with a mercaptobenzothiazole ligand; and combinations thereof.

14. The method of claim 11 wherein the metal containing compound is zinc oxide.

15. The method of claim 11 wherein the latex is a styrene/butadiene copolymer latex emulsion.

16. The method of claim 11 wherein the latex has a styrene/butadiene weight ratio of about 25:75, with the styrene/butadiene copolymer suspended in a 50% by weight aqueous emulsion.

17. The method of claim 11 wherein the latex is present in a range of 41% to 90% by weight of the sealing composition.

18. The method of claim 11 wherein the latex comprises at least one from the following group: natural rubber; modified natural rubber; synthetic polymers; and blends thereof.

19. The method of claim 18 wherein the synthetic polymers comprise at least one from the following group: styrene/butadiene rubber; polybutadiene rubber; neoprene rubber; acrylonitrile/butadiene rubber; polyisoprene rubber; isobutylene/isoprene rubber; ethylene/propylene rubber; and combinations thereof.

20. The method of claim 11 wherein the dithio carbamate is present in a range of 0.1% to 2% by weight of the latex in the sealing composition.

21. The method of claim 11 wherein the metal containing compound is present in a range of 2% to 5% by weight of the latex in the sealing composition.

22. The method of claim 11 wherein the sulfur is present in a range of 1% to 4% by weight of the latex in the sealing composition.

23. The method of claim 11 wherein the sealing composition further comprises stearic acid.

24. The method of claim 23 wherein the stearic acid is present in a range of 0.1% to 2% by weight of the latex in the sealing composition.

25. The method of claim 11 wherein the sealing composition further comprises a weighting agent.

26. The method of claim 25 wherein the weighting agent is present in a range of 0.1% to 150% by weight of the latex in the sealing composition.

27. The method of claim 11 wherein the sealing composition further comprises a foaming agent.

28. The method of claim 27 wherein the foaming agent is present in a range of 2% to 4% by weight of the latex in the sealing composition.

29. The method of claim 1 wherein the expandable tubular is expanded during or after the set of the sealing composition.

30. The method of claim 1 wherein the sealing composition is foamed with a gas.

31. The method of claim 30 wherein the sealing composition is foamed using nitrogen or air.

32. The method of claim 30 wherein the gas is generally present in the range of from about 0% to about 40% by volume of the sealing composition.

33. The method of claim 1 wherein:
placing a resilient sealing composition into the wellbore occurs before or after placing the expandable tubular in the wellbore;
expanding the expandable tubular occurs before or after placing a resilient sealing composition into the wellbore; and
allowing the sealing composition to set in the wellbore occurs before, after, or during expanding the expandable tubular.

34. The method of claim 33 wherein the sealing composition comprises at least one from the following group: copolymers; terpolymers; interpolymers; and combinations thereof.

35. The method of claim 34 wherein the polymer comprises a latex and the sealing composition further comprises sulfur.

36. The method of claim 35 wherein the latex comprises a styrene/butadiene copolymer.

37. The method of claim 35 wherein the latex comprises at least one from the following group: natural rubber; modified natural rubber; synthetic polymers; and blends thereof.

38. The method of claim 37 wherein the synthetic polymers comprise at least one from the following group: styrene/butadiene rubber; polybutadiene rubber; neoprene rubber; acrylonitrile/butadiene rubber; polyisoprene rubber; isobutylene/isoprene rubber; ethylene/propylene rubber; and combinations thereof.

39. The method of claim 33 wherein the sealing composition further comprises latex, dithio carbamate, and sulfur.

40. The method of claim 39 wherein the metal containing compound comprises at least one from the following group: zinc; tin; iron; selenium; magnesium; chromium; nickel; cadmium; and combinations thereof.

41. The method of claim 40 wherein the metal containing compound comprises at least one from the following group: oxides; carboxylic acid salts; complexes with a dithiocarbamate ligand; complexes with a mercaptobenzothiazole ligand; and combinations thereof.

42. The method of claim 33 wherein the sealing composition is foamed with a gas.

43. The method of claim 42 wherein the gas is generally present in the range of from about 0% to about 40% by volume of the sealing composition.

44. The method of claim 33 wherein the sealing composition comprises at least one from the following group: ethylene propylene diene polymers; isobutylene-isoprene copolymers; halogenated derivatives of isobutylene-isoprene copolymers; butadiene-isoprene copolymers; poly(isobutylene-co-styrene) polymers; halogenated derivatives of poly(isobutylene-co-styrene) polymers; poly(isobutylene-co-alkyl styrene) polymers; halogenated derivatives of poly(isobutylene-co-alkyl styrene) polymers; poly(isobutylene-co-haloalkyl styrene) polymers; halogenated derivatives of poly(isobutylene-co-haloalkyl styrene) polymers; and combinations thereof.

45. The method of claim 1 wherein the polymer comprises at least one from the following group: ethylene propylene diene polymers; isobutylene-isoprene copolymers; halogenated derivatives of isobutylene-isoprene copolymers; butadiene-isoprene copolymers; poly(isobutylene-co-styrene) polymers; halogenated derivatives of poly(isobutylene-co-styrene) polymers; poly(isobutylene-co-alkyl styrene) polymers; halogenated derivatives of poly(isobutylene-co-alkyl styrene) polymers; poly(isobutylene-co-haloalkyl styrene) polymers; halogenated derivatives of poly(isobutylene-co-haloalkyl styrene) polymers; and combinations thereof.

46. A method of sealing an expandable tubular in a wellbore comprising the steps of:
placing the expandable tubular in the wellbore;
placing a polymeric sealing composition that comprises a metal containing compound into the wellbore;
expanding the expandable tubular; and
allowing the sealing composition to set in the wellbore in contact with the expandable tubular.

47. The method of claim 46 wherein the polymeric sealing composition comprises at least one from the following group: copolymers; terpolymers; interpolymers; and combinations thereof.

48. The method of claim 46 wherein the sealing composition comprises latex and sulfur.

49. The method of claim 48 wherein the latex comprises a styrene/butadiene copolymer.

50. The method of claim 48 wherein the latex has a styrene/butadiene weight ratio of about 25:75, with the styrene/butadiene copolymer suspended in a 50% by weight aqueous emulsion.

51. The method of claim 48 wherein the latex is present in a range of 41% to 90% by weight of the sealing composition.

52. The method of claim 48 wherein the latex comprises at least one from the following group: natural rubber; modified natural rubber; synthetic polymers; and blends thereof.

53. The method of claim 52 wherein the synthetic polymers comprise at least one from the following group: styrene/butadiene rubber; polybutadiene rubber; neoprene rubber; acrylonitrile/butadiene rubber; polyisoprene rubber; isobutylene/isoprene rubber; ethylene/propylene rubber; and combinations thereof.

54. The method of claim 46 wherein the metal containing compound comprises at least one from the following group: zinc; tin; iron; selenium; magnesium; chromium; nickel; cadmium; and combinations thereof.

55. The method of claim 54 wherein the metal containing compound comprises at least one from the following group: oxides; carboxylic acid salts; complexes with a dithiocarbamate ligand; complexes with a mercaptobenzothiazole ligand; and combinations thereof.

56. The method of claim 46 wherein the sealing composition further comprises latex, dithio carbamate, and sulfur.

57. The method of claim 56 wherein the metal containing compound comprises at least one from the following group: zinc; tin; iron; selenium; magnesium; chromium; nickel; cadmium; and combinations thereof.

58. The method of claim 56 wherein the metal containing compound comprises at least one from the following group: oxides; carboxylic acid salts; complexes with a dithiocarbamate ligand; complexes with a mercaptobenzothiazole ligand; and combinations thereof.

59. The method of claim 56 wherein the metal containing compound is zinc oxide.

60. The method of claim 56 wherein the latex is a styrene/butadiene copolymer latex emulsion.

61. The method of claim 56 wherein the latex has a styrene/butadiene weight ratio of about 25:75, with the styrene/butadiene copolymer suspended in a 50% by weight aqueous emulsion.

62. The method of claim 56 wherein the latex is present in a range of 41% to 90% by weight of the sealing composition.

63. The method of claim 56 wherein the latex comprises at least one from the following group: natural rubber; modified natural rubber; synthetic polymers; and blends thereof.

64. The method of claim 63 wherein the synthetic polymers comprise at least one from the following group: styrene/butadiene rubber; polybutadiene rubber; neoprene rubber; acrylonitrile/butadiene rubber; polyisoprene rubber; isobutylene/isoprene rubber; ethylene/propylene rubber; and combinations thereof.

65. The method of claim 56 wherein the dithio carbamate is present in a range of 0.1% to 2% by weight of the latex in the sealing composition.

66. The method of claim 56 wherein the metal containing compound is present in a range of 2% to 5% by weight of the latex in the sealing composition.

67. The method of claim 56 wherein the sulfur is present in a range of 1% to 4% by weight of the latex in the sealing composition.

68. The method of claim 56 wherein the sealing composition further comprises stearic acid.

69. The method of claim 68 wherein the stearic acid is present in a range of 0.1% to 2% by weight of the latex in the sealing composition.

70. The method of claim 56 wherein the sealing composition further comprises a weighting agent.

71. The method of claim 70 wherein the weighting agent is present in a range of 0.1% to 150% by weight of the latex in the sealing composition.

72. The method of claim 56 wherein the sealing composition further comprises a foaming agent.

73. The method of claim 72 wherein the foaming agent is present in a range of 2% to 4% by weight of the latex in the sealing composition.

74. The method of claim 46 wherein the expandable tubular is expanded during or after the set of the sealing composition.

75. The method of claim 46 wherein the sealing composition is foamed with a gas.

76. The method of claim 75 wherein the sealing composition is foamed using nitrogen or air.

77. The method of claim 75 wherein the gas is generally present in the range of from about 0% to about 40% by volume of the sealing composition.

78. The method of claim 46 wherein the sealing composition comprises at least one from the following group: ethylene propylene diene polymers; isobutylene-isoprene copolymers; halogenated derivatives of isobutylene-isoprene copolymers; butadiene-isoprene copolymers; poly(isobutylene-co-styrene) polymers; halogenated derivatives of poly(isobutylene-co-styrene) polymers; poly(isobutylene-co-alkyl styrene) polymers; halogenated derivatives of poly(isobutylene-co-alkyl styrene) polymers; poly(isobutylene-co-haloalkyl styrene) polymers; halogenated derivatives of poly(isobutylene-co-haloalkyl styrene) polymers; and combinations thereof.

79. A method of sealing an expandable tubular in a wellbore comprising the steps of:
placing the expandable tubular in the wellbore;
placing a foamed sealing composition into the wellbore;
expanding the expandable tubular; and
allowing the sealing composition to set in the wellbore.

80. The method of claim 79 wherein the sealing composition comprises a foaming agent.

81. The method of claim 79 wherein the sealing composition comprises a gas.

82. The method of claim 81 wherein the gas comprises at least one from the following group: nitrogen; air; and combinations thereof.

83. The method of claim 81 wherein the gas is generally present in the range of from about 0% to about 40% by volume of the sealing composition.

84. The method of claim 79 wherein the sealing composition comprises a polymer and a metal containing compound.

85. The method of claim 84 wherein the sealing composition comprises at least one from the following group: copolymers; terpolymers; interpolymers; and combinations thereof.

86. The method of claim 84 wherein the polymer comprises a latex and the sealing composition further comprises sulfur.

87. The method of claim 86 wherein the latex comprises a styrene/butadiene copolymer.

88. The method of claim 86 wherein the latex has a styrene/butadiene weight ratio of about 25:75, with the styrene/butadiene copolymer suspended in a 50% by weight aqueous emulsion.

89. The method of claim 86 wherein the latex is present in a range of 41% to 90% by weight of the sealing composition.

90. The method of claim 86 wherein the latex comprises at least one from the following group: natural rubber; modified natural rubber; synthetic polymers; and blends thereof.

91. The method of claim 90 wherein the synthetic polymers comprise at least one from the following group: styrene/butadiene rubber; polybutadiene rubber; neoprene rubber; acrylonitrile/butadiene rubber; polyisoprene rubber; isobutylene/isoprene rubber; ethylene/propylene rubber; and combinations thereof.

92. The method of claim 84 wherein the metal containing compound comprises at least one from the following group: zinc; tin; iron; selenium; magnesium; chromium; nickel; cadmium; and combinations thereof.

93. The method of claim 92 wherein the metal containing compound comprises at least one from the following group: oxides; carboxylic acid salts; complexes with a dithiocarbamate ligand; complexes with a mercaptobenzothiazole ligand; and combinations thereof.

94. The method of claim 84 wherein the polymer comprises at least one from the following group: ethylene propylene diene polymers; isobutylene-isoprene copolymers; halogenated derivatives of isobutylene-isoprene copolymers; butadiene-isoprene copolymers; poly(isobutylene-co-styrene) polymers; halogenated derivatives of poly(isobutylene-co-styrene) polymers; poly(isobutylene-co-alkyl styrene) polymers; halogenated derivatives of poly(isobutylene-co-alkyl styrene) polymers; poly(isobutylene-co-haloalkyl styrene) polymers; halogenated derivatives of poly(isobutylene-co-haloalkyl styrene) polymers; and combinations thereof.

95. The method of claim 79 wherein the sealing composition further comprises latex, dithio carbamate, and sulfur.

96. The method of claim 95 wherein the metal containing compound comprises at least one from the following group: zinc; tin; iron; selenium; magnesium; chromium; nickel; cadmium; and combinations thereof.

97. The method of claim 96 wherein the metal containing compound comprises at least one from the following group: oxides; carboxylic acid salts; complexes with a dithiocarbamate ligand; complexes with a mercaptobenzothiazole ligand; and combinations thereof.

98. The method of claim 95 wherein the metal containing compound is zinc oxide.

99. The method of claim 95 wherein the latex is a styrene/butadiene copolymer latex emulsion.

100. The method of claim 95 wherein the latex has a styrene/butadiene weight ratio of about 25:75, with the styrene/butadiene copolymer suspended in a 50% by weight aqueous emulsion.

101. The method of claim 95 wherein the latex is present in a range of 41% to 90% by weight of the sealing composition.

102. The method of claim 95 wherein the latex comprises at least one from the following group: natural rubber; modified natural rubber; synthetic polymers; and blends thereof.

103. The method of claim 102 wherein the synthetic polymers comprise at least one from the following group: styrene/butadiene rubber; polybutadiene rubber; neoprene rubber; acrylonitrile/butadiene rubber; polyisoprene rubber; isobutylene/isoprene rubber; ethylene/propylene rubber; and combinations thereof.

104. The method of claim 95 wherein the dithio carbamate is present in a range of 0.1% to 2% by weight of the latex in the sealing composition.

105. The method of claim 95 wherein the metal containing compound is present in a range of 2% to 5% by weight of the latex in the sealing composition.

106. The method of claim 95 wherein the sulfur is present in a range of 1% to 4% by weight of the latex in the sealing composition.

107. The method of claim 95 wherein the sealing composition further comprises stearic acid.

108. The method of claim 107 wherein the stearic acid is present in a range of 0.1% to 2% by weight of the latex in the sealing composition.

109. The method of claim 95 wherein the sealing composition further comprises a weighting agent.

110. The method of claim 109 wherein the weighting agent is present in a range of 0.1% to 150% by weight of the latex in the sealing composition.

111. The method of claim 95 wherein the sealing composition further comprises a foaming agent.

112. The method of claim 111 wherein the foaming agent is present in a range of 2% to 4% by weight of the latex in the sealing composition.

113. The method of claim 79 wherein the expandable tubular is expanded during or after the set of the sealing composition.

114. A method of sealing expandable tubulars in a wellbore comprising the steps of:
  (a) placing a first expandable tubular in the wellbore;
  (b) placing a first resilient sealing composition into the wellbore before or after step (a);
  (c) expanding the first expandable tubular before or after step (b);
  (d) allowing the first resilient sealing composition to set in the wellbore before, after or during step (c);
  (e) extending the wellbore below the first expandable tubular;
  (f) placing a second expandable tubular in the wellbore;
  (g) placing a second resilient sealing composition into the wellbore before or after step (f);
  (h) expanding the second expandable tubular before or after step (g); and
  (i) allowing the second resilient sealing composition to set in the wellbore before, after or during step (h).

115. The method of claim 114 wherein at least one of said first and second sealing compositions comprises at least one from the following group: copolymers; terpolymers; interpolymers; and combinations thereof.

116. The method of claim 114 wherein at least one of said first and second sealing compositions comprises latex and sulfur.

117. The method of claim 116 wherein the latex comprises a styrene/butadiene copolymer.

118. The method of claim 116 wherein the latex comprises at least one from the following group: natural rubber; modified natural rubber; synthetic polymers; and blends thereof.

119. The method of claim 118 wherein the synthetic polymers comprise at least one from the following group: styrene/butadiene rubber; polybutadiene rubber; neoprene rubber; acrylonitrile/butadiene rubber; polyisoprene rubber; isobutylene/isoprene rubber; ethylene/propylene rubber; and combinations thereof.

120. The method of claim 114 wherein at least one of said first and second sealing compositions comprises latex, dithio carbamate, metal containing compound, and sulfur.

121. The method of claim 120 wherein the metal containing compound comprises at least one from the following group: zinc; tin; iron; selenium; magnesium; chromium; nickel; cadmium; and combinations thereof.

122. The method of claim 121 wherein the metal containing compound comprises at least one from the following group: oxides; carboxylic acid salts; complexes with a dithiocarbamate ligand; complexes with a mercaptobenzothiazole ligand; and combinations thereof.

123. The method of claim 114 at least one of said first and second sealing compositions is foamed with a gas.

124. The method of claim 123 wherein the gas is generally present in the range of from about 0% to about 40% by volume of the sealing composition.

125. The method of claim 123 further comprising the steps of:
  (i) extending the second tubular into the first tubular after the first tubular has been expanded and the first sealing composition is placed in the wellbore;
  (j) expanding the second tubular in the first tubular; and
  (k) providing additional expansion to said first tubular wherein the first sealing composition is further compressed but remains competent.

126. The method of claim 114 wherein at least one of said first and second sealing compositions comprises at least one from the following group: ethylene propylene diene polymers; isobutylene-isoprene copolymers; halogenated derivatives of isobutylene-isoprene copolymers; butadiene-isoprene copolymers; poly(isobutylene-co-styrene) polymers; halogenated derivatives of poly(isobutylene-co-styrene) polymers; poly(isobutylene-co-alkyl styrene) polymers; halogenated derivatives of poly(isobutylene-co-alkyl styrene) polymers; poly(isobutylene-co-haloalkyl styrene) polymers; halogenated derivatives of poly(isobutylene-co-haloalkyl styrene) polymers; and combinations thereof.

* * * * *